US012810428B2

(12) United States Patent
Said et al.

(10) Patent No.: US 12,810,428 B2
(45) Date of Patent: Nov. 24, 2026

(54) INTELLIGENT PLANT DISEASE DETECTION SYSTEM AND METHOD

(71) Applicant: UNIVERSITY OF SHARJAH, Sharjah (AE)

(72) Inventors: Zafar Said, Sharjah (AE); Abdennabi Morchid, Sharjah (AE); Rachid El Alami, Sharjah (AE)

(73) Assignee: UNIVERSITY OF SHARJAH, Sharjah (AE)

( * ) Notice: Subject to any disclaimer, the term of this patent is extended or adjusted under 35 U.S.C. 154(b) by 0 days.

(21) Appl. No.: 19/438,001

(22) Filed: Dec. 31, 2025

(65) Prior Publication Data

US 2026/0187797 A1 Jul. 2, 2026

Related U.S. Application Data

(60) Provisional application No. 63/740,529, filed on Dec. 31, 2024.

(51) Int. Cl.
*G06T 7/00* (2017.01)

(52) U.S. Cl.
CPC .. *G06T 7/0012* (2013.01); *G06T 2207/20081* (2013.01); *G06T 2207/30188* (2013.01)

(58) Field of Classification Search
CPC ......... G06T 7/0012; G06T 2207/20081; G06T 2207/30188; G06V 20/68; G06V 20/17; G06V 20/188; G06V 10/58; G06V 10/56
See application file for complete search history.

(56) References Cited

U.S. PATENT DOCUMENTS

| | | | | |
|---|---|---|---|---|
| 10,713,542 | B2 * | 7/2020 | Gui | A01B 79/005 |
| 10,949,974 | B2 * | 3/2021 | King | G06T 7/0014 |
| 11,195,015 | B2 | 12/2021 | Tran et al. | |
| 11,663,414 | B2 | 5/2023 | Bongartz et al. | |
| 11,789,453 | B2 | 10/2023 | Chowdhary et al. | |

(Continued)

FOREIGN PATENT DOCUMENTS

| | | | |
|---|---|---|---|
| AU | 2020102100 | A4 | 10/2020 |
| CN | 101938512 | A | 1/2011 |

(Continued)

OTHER PUBLICATIONS

Zeng, Qingtian, et al. "SEViT: a large-scale and fine-grained plant disease classification model based on transformer and attention convolution." Multimedia Systems 29.3 (2023): 1001-1010. (Year: 2023).*

(Continued)

*Primary Examiner* — Henok Shiferaw
*Assistant Examiner* — Urooj Fatima
(74) *Attorney, Agent, or Firm* — MH2 Technology Law Group, LLP

(57) ABSTRACT

The present disclosure discloses an intelligent plant disease detection system and method for agricultural crops, the detection system comprising: a camera configured to obtain spectral and photographic data of the crops; an analysis module configured to receive the spectral and photographic data from the camera, perform image processing on the spectral and photographic data, and identify plant diseases; and a wireless communication module configured to transmit data including the identified plant diseases to a server.

10 Claims, 3 Drawing Sheets

(56) References Cited

U.S. PATENT DOCUMENTS

| | | | | |
|---|---|---|---|---|
| 12,277,762 B1 * | 4/2025 | Muhammad | G06V 20/10 | |
| 2021/0000006 A1 * | 1/2021 | Ellaboudy | A01B 69/001 | |
| 2021/0045379 A1 * | 2/2021 | Grant | A01B 79/005 | |
| 2022/0230305 A1 * | 7/2022 | Picon | G06V 10/764 | |
| 2022/0414795 A1 | 12/2022 | Fores et al. | | |
| 2023/0165181 A1 * | 6/2023 | Scheiner | A01B 69/001 | 47/1.41 |
| 2023/0326203 A1 * | 10/2023 | Wang | G06V 10/774 | 348/158 |

FOREIGN PATENT DOCUMENTS

| | | |
|---|---|---|
| CN | 116739216 A | 9/2023 |
| JP | 6539901 B2 | 7/2019 |

OTHER PUBLICATIONS

Ali, A. et al., "Application of Smart Techniques, Internet of Things and Data Mining for Resource Use Efficient and Sustainable Crop Production," Agriculture, Feb. 7, 2023, pp. 1-38, vol. 13, Issue 2.

Jafar A. et al., "Revolutionizing agriculture with artificial intelligence: plant disease detection methods, applications, and their limitations," Frontiers in Plant Science, Mar. 13, 2024, pp. 1-20, vol. 15.

* cited by examiner

INTELLIGENT PLANT DISEASE DETECTION SYSTEM AND METHOD

FIELD

The present disclosure concerns intelligent plant disease detection. More specifically, but not exclusively, the present disclosure concerns an intelligent plant disease detection system and method for agricultural crops incorporating machine learning that analysis spectral and photographic data. This system, unlike any other existing technology, will be able to integrate spectral and photographic analysis using advanced algorithms of machine learning that can achieve much higher accuracy and efficiency. The integration of IoT and embedded systems permits monitoring of diseases in real time and remotely, improving immensely over previous methods that are either manual or semi-automated.

BACKGROUND

Background description includes information that will be useful in understanding the present invention. It is not an admission that any of the information provided herein is prior art or relevant to the presently claimed invention, or that any publication specifically or implicitly referenced is prior art.

Plant disease is a significant contributor to lost agricultural crops. Any delay and missed diagnosis can cause the disease to spread through the crops untreated, causing greater losses. Not only is this a loss for the farmer, but environmentally damaging since the resources that have been used to create the crops will have gone to waste.

Accurate and effective detection of plant diseases remains a significant challenge in agriculture. Many of the current methods are not only imprecise but also require extensive manual intervention, which can lead to delayed responses and potential crop losses. Such inefficiencies in disease detection can adversely affect crop health and agricultural productivity, reducing farmers'incomes, threatening food security, and jeopardizing the long-term sustainability of farming systems.

The present disclosure seeks to overcome one or more of the aforementioned problems. More specifically, but not exclusively, the present disclosure seeks to provide an improved plant disease detection system. Most of the existing plant disease detection solutions are based on either purely manual inspections or isolated input from sensors, resulting in inaccurate and late diagnosis. Most of the existing techniques are also not scalable and adaptable to diverse agricultural environmental conditions. This disclosure overcomes the shortcomings of these with a holistic automated system using machine learning techniques for analysis of spectral and photographic data to ensure timely and accurate disease detection across multiple fields and crop types.

SUMMARY

According to a first aspect of the present disclosure, there is provided an intelligent plant disease detection system for agricultural crops. The detection system comprises: a camera configured to obtain spectral and photographic data of the crops; an analysis module configured to receive the spectral and photographic data from the camera, perform image processing on the spectral and photographic data, and identify plant diseases; and a wireless communication module configured to transmit data including the identified plant diseases to a server.

By using camera and spectral data in combination, the system is able to detect diseases early, quicky, and reliably, enabling timely intervention and reducing crop losses.

The detection system may comprise an actuation assembly configured to move the camera relative to the agricultural crops. By having the camera movable relative to the agricultural crops, only a single camera may be needed to scan one or more fields, reducing hardware costs and simplifying system deployment.

The actuation assembly may be a motor. Using a motor provides precise and controllable movement of the camera, enabling systematic and repeatable scanning patterns across the crops.

The motor may be a rotary motor. A rotary motor enables smooth rotational movement, allowing the camera to cover a wide angular range of crops from a fixed position.

By having the camera movable relative to the agricultural crops, only a single camera may be needed to scan one or more fields.

One camera may be used to scan multiple fields.

The design of the detection system will be such that it can be scaled up or down from smallholder plots to large commercial farms, depending on farm sizes. The system will allow support for several crop types through the customization of the machine learning model according to specific agricultural needs. This makes the effectiveness of the deployment adaptable within environments and farming practices.

The camera may form part of an array, the array being arranged to move along a length of a field of agricultural crops. The array may comprise a plurality of cameras. The array may comprise one or more additional sensors. The sensor may comprise infrared sensors.

The analysis module may comprise a machine learning component. By analyzing the images using machine learning, the analysis can take place quickly and in real-time, with multiple fields across a network potentially being analyzed simultaneously, improving detection speed and scalability.

The machine learning component may have been trained on agricultural crops afflicted with a known disease, such that the machine learning component is capable of identifying that same disease in a different plant. Training on known diseases enables accurate and consistent identification of disease symptoms, reducing reliance on manual expert inspection and minimizing human error.

The analysis module may be on-board. The analysis may take place on an on-board processor, as opposed to sending the images to a server or computer to be analyzed.

The wireless communication module may adopt an advanced publish-subscribe type communication protocol to realize efficient data interaction between the detection system and multiple connected agricultural devices and may support seamless compatibility with different remote monitoring platforms. This enables efficient and scalable communication across distributed agricultural systems, facilitating integration with diverse monitoring infrastructure.

The system may be operatively linked with existing farm management subsystems and may be configured to trigger targeted adjustment of farm operation strategies including irrigation, pesticide application and fertilization. This integration enables automated and precise responses to detected diseases, optimizing resource usage and reducing unnecessary chemical applications.

The camera may be integrated with one or more additional sensors for more comprehensive crop monitoring. Integrating additional sensors provides richer data for analysis, enabling detection of a wider range of crop health indicators beyond visible symptoms.

The identified diseases may be transmitted wirelessly to a computer or mobile device, enabling the status of the system to be monitored remotely.

The system may comprise a rig, the rig comprising the camera. The rig may comprise one or more embedded controllers. The rig may comprise the actuation assembly. The camera may comprise an actuator. The camera may comprise an embedded controller.

The system may also be integrated with drones for capturing photographic and spectral data of crops to enhance coverage and flexibility. The camera and sensor assembly may be mounted on drones to facilitate data capture in large areas of the crops, even those difficult to reach. This, therefore, allows for aerial monitoring, enabling much improvement in the accuracy and efficiency of disease detection.

According to a second aspect of the present disclosure, there is provided a method of detecting plant disease in agricultural crops. The method comprises: capturing spectral and photographic data of the crops using a camera; receiving the spectral and photographic data at an analysis module; performing image processing on the spectral and photographic data; identifying plant diseases based on the image processing; and transmitting data including the identified plant diseases to a server via a wireless communication module. This method enables automated, accurate, and timely detection of plant diseases, allowing farmers to respond proactively and minimize crop damage.

The method may comprise moving the camera relative to the agricultural crops using an actuation assembly. Moving the camera enables comprehensive coverage of crop areas with minimal hardware, improving efficiency and reducing deployment complexity.

Moving the camera may comprise actuating a motor. Using a motor provides controlled and repeatable camera movement, ensuring consistent data capture across scanning cycles.

The motor may be a rotary motor. A rotary motor enables efficient angular coverage, allowing the camera to scan wide areas from a single mounting position.

Either or both of the image processing or identifying steps use a machine learning component. Machine learning enables rapid and accurate image processing and disease identification, reducing the time between detection and intervention.

The machine learning component may have been trained on agricultural crops afflicted with a known disease, such that the machine learning component is capable of identifying that same disease in a different plant, such as in undiagnosed crops. This training approach enables reliable generalization of disease detection across different plants and field conditions.

Transmitting data may comprise adopting an advanced publish-subscribe type communication protocol to realize efficient data interaction between the detection system and multiple connected agricultural devices and supporting seamless compatibility with different remote monitoring platforms. This communication approach enables scalable and flexible data distribution, supporting integration with various agricultural management systems.

The method may comprise operatively linking with existing farm management subsystems and triggering targeted adjustment of farm operation strategies including irrigation, pesticide application and fertilization. This enables closed-loop disease management, where detection directly informs and optimizes farm operations for improved crop health and resource efficiency.

The method may comprise capturing data from one or more additional sensors integrated with the camera for more comprehensive crop monitoring. Additional sensor data enhances the accuracy and scope of crop health assessment, enabling detection of conditions that may not be visible in photographic or spectral data alone.

An unmanned aerial vehicle (drone) is integrated for capturing photographic and spectral data of crops.

It will be understood that features disclosed in relation to one aspect of the present disclosure may be applicable to another aspect of the present disclosure and vice versa.

BRIEF DESCRIPTION OF THE DRAWINGS

The manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the present disclosure may admit to other equally effective embodiments.

The foregoing and other objects, features and advantages of the present invention, as well as the invention itself, will be more fully understood from the following description of preferred embodiments, when read together with the accompanying drawings.

DETAILED DESCRIPTION

The present disclosure relates to the field of intelligent plant disease detection and, more particularly to but not exclusively, to intelligent plant disease detection system and method for agricultural crops incorporating machine learning that analysis spectral and photographic data.

Figure 1:
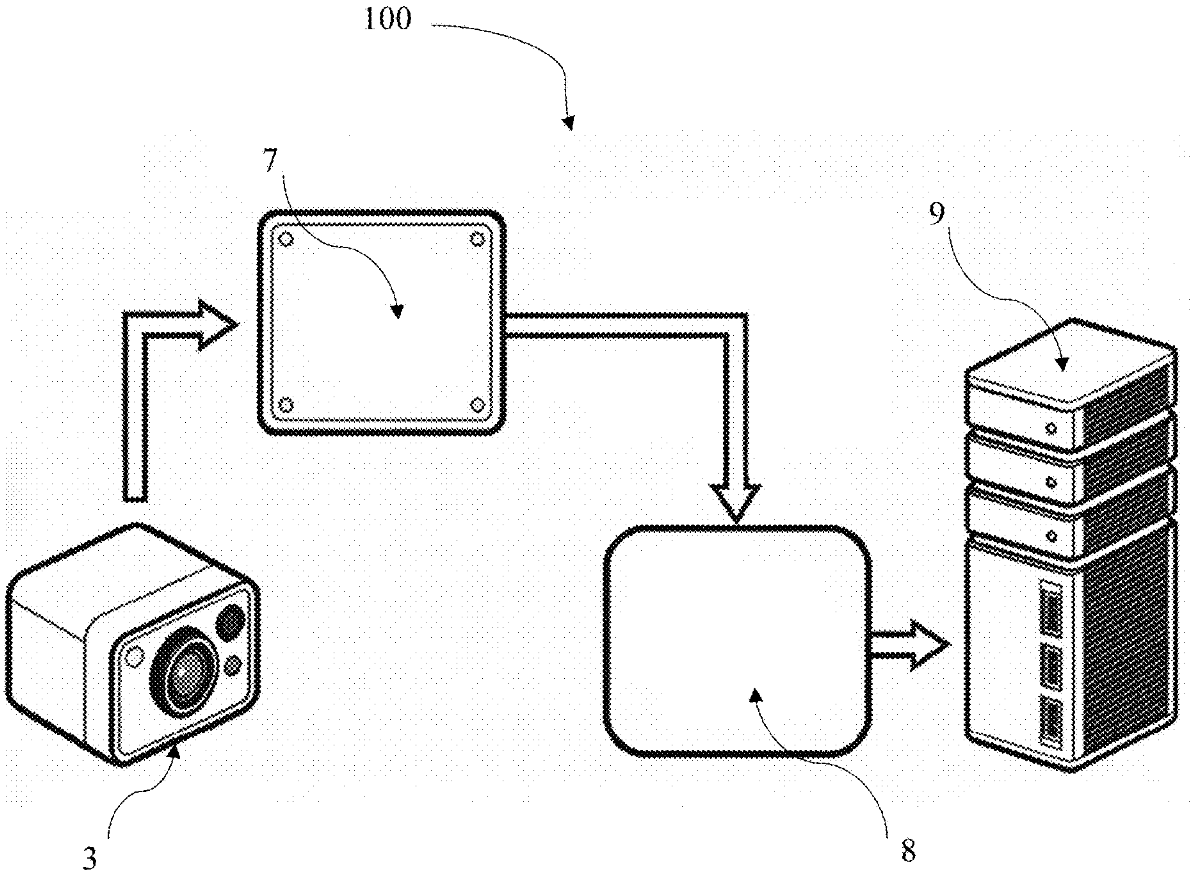
FIG. 1 shows a schematic of an intelligent plant disease detection system for agricultural crops according to an embodiment of the present disclosure.
Figure 2:
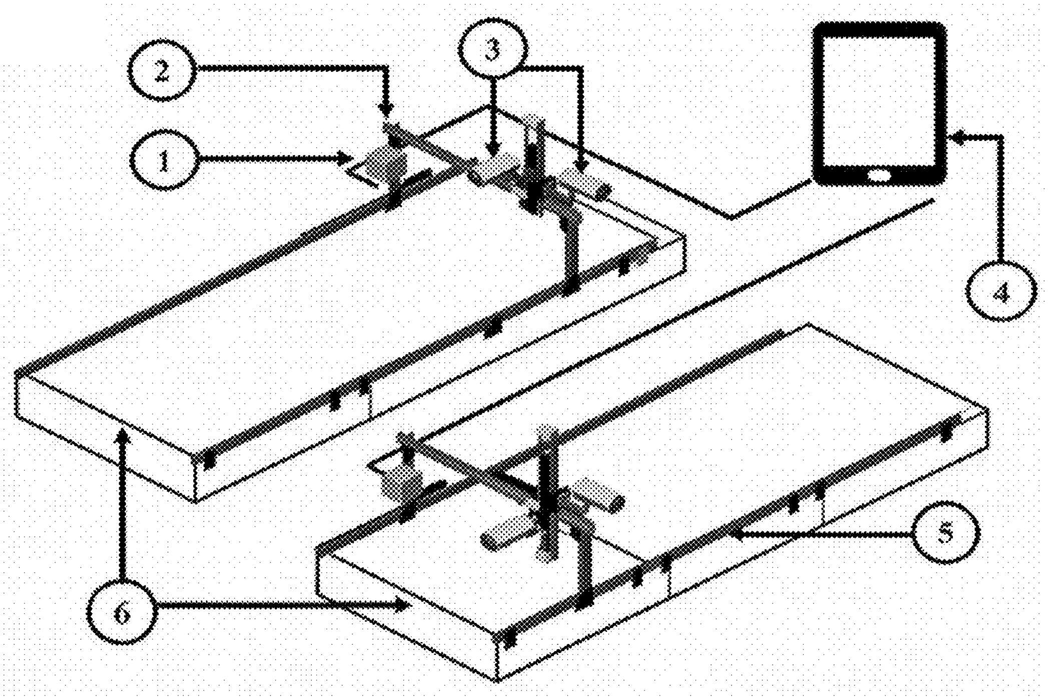
FIG. 2 shows a schematic of an intelligent plant disease detection system for agricultural crops according to another embodiment of the present disclosure.
Figure 3:
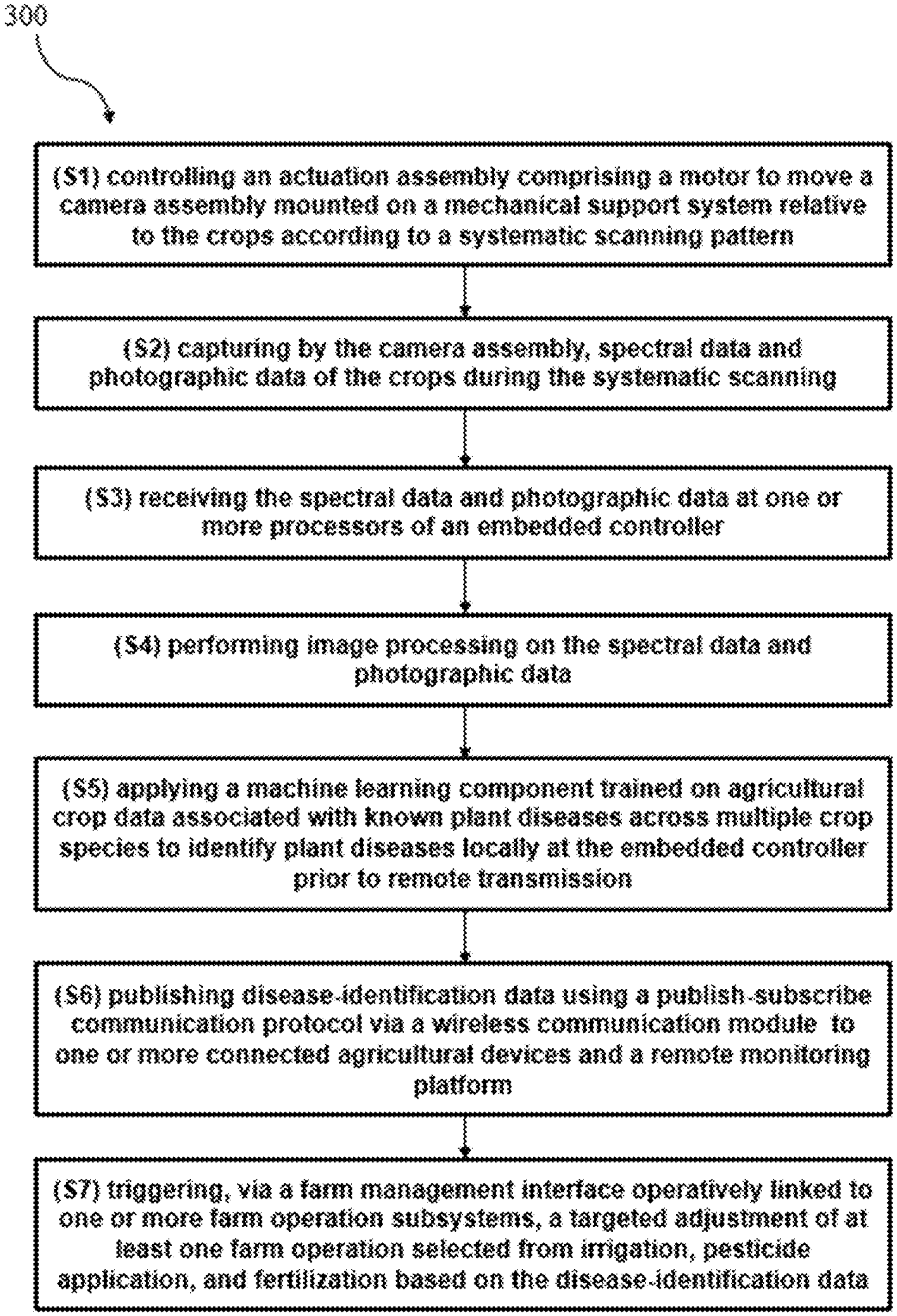
FIG. 3 shows a flow chart of a method of detecting plant disease in agricultural crops according to an embodiment of the present disclosure.

The principles of the present invention and their advantages are best understood by referring to FIGS. 1 to 3. In the following detailed description of illustrative or exemplary embodiments of the disclosure, specific embodiments in which the disclosure may be practiced are described in sufficient detail to enable those skilled in the art to practice the disclosed embodiments. The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

FIG. 1 shows a schematic of the intelligent plant disease detection system 100 for agricultural crops according to an embodiment of the present disclosure. The detection system comprises: a camera 3 configured to obtain spectral and photographic data of the crops; an analysis module 7 configured to receive the spectral and photographic data from the camera, perform image processing on the spectral and photographic data, and identify plant diseases; and a wireless communication module 8 configured to transmit data including the identified plant diseases to a server 9.

FIG. 2 shows a schematic of the intelligent plant disease detection system according to another embodiment of the present disclosure.

This intelligent plant disease detection system 100 includes an embedded controller 1, a mechanical support system 2, a camera 3, a platform PC or phone 4, a base 5 on which the support system moves, and the smart farm model 6. In one embodiment, the platform PC or phone 4 includes the analysis module 7 and the wireless communication module 8.

Embodiments of the present disclosure address the need for efficient and accurate detection of plant diseases in agricultural environments, overcoming the limitations of existing methods. The system according to embodiments integrates embedded systems and IoT technologies to create an intelligent agricultural system specifically designed for disease detection and management. An aspect of the present disclosure includes a comprehensive disease detection methodology, exploiting advanced algorithms and image processing techniques. The system uses the camera 3 to capture spectral and photographic data from crops, which is then analyzed in real-time by onboard controllers. This analysis enables accurate identification and diagnosis of plant diseases, providing farmers with timely information for proactive management.

A feature of embodiments of the present disclosure is the integration of a mechanical support system 2, controlled by a rotary motor, which enables systematic crop scanning as part of the intelligent farming model. This ensures complete coverage and accurate imaging, facilitating precise detection of disease in agricultural fields. In addition, embodiments allow for the wireless transmission of disease identification results to computers or mobile devices 4, enabling the status of the system to be monitored remotely from any location. This feature improves accessibility and convenience for farmers, enabling them to make decisions and intervene promptly when necessary. Further, the scalability and adaptability of the proposed solution make it suitable for different farming environments and crop types. Whether used on small-scale farms or large-scale commercial operations, the system can be customized to meet specific needs and requirements, making it versatile and widely applicable. The system represents an advance in agricultural technology, offering a holistic solution to the pressing challenge of plant disease detection. By providing farmers with an effective, accurate, and accessible tool for disease management, the present disclosure aims to improve crop health, productivity, and sustainability in farming practices.

It will be appreciated that the present disclosure uses a multidisciplinary approach spanning agricultural technology, focusing specifically on methods and systems for detecting and managing plant diseases, various aspects of embedded systems, IoT technologies, image processing, and machine learning algorithms. The present disclosure addresses the intersection between agriculture, technology and data science to develop solutions for crop disease detection and monitoring.

Embodiments of the present disclosure introduce a method for plant disease detection, leveraging the power of embedded systems and IoT (internet of things) technologies. It outlines a comprehensive approach that utilizes advanced algorithms and image processing techniques to analyze spectral and photographic data captured by the camera 3. Embodiments of the present disclosure integrate a mechanical support system driven by a rotary motor, which facilitates systematic crop scanning within an intelligent agricultural model. This feature ensures thorough coverage and precise imaging, enabling accurate disease detection across agricultural fields.

Additionally, embodiments of the present disclosure support wireless transmission of disease identification results to computers or mobile devices, allowing for remote monitoring from any location. Given its scalability and adaptability, this system is suitable for various farming environments and crop types, providing farmers with an effective, precise, and accessible tool to enhance crop health, productivity, and sustainability.

Integration with Drones: The system will also be able to integrate with drones in order to increase its scope and adaptability. Equipped with the camera and sensor assembly, the drones extend the reach for data to be captured from enlarged crop areas that otherwise could not be accessed. Integration will, therefore, enable one to monitor crops from the air and gather data, while increasing the efficiency and accuracy of disease detection.

FIG. 3 shows a method 300 of detecting plant disease in agricultural crops. The method comprises: (S1) controlling an actuation assembly comprising a motor to move a camera assembly mounted on a mechanical support system relative to the crops according to a systematic scanning pattern; (S2) capturing by the camera assembly, spectral data and photographic data of the crops during the systematic scanning; (S3) receiving the spectral data and photographic data at one or more processors of an embedded controller; (S4) performing image processing on the spectral data and photographic data; (S5) applying a machine learning component trained on agricultural crop data associated with known plant diseases across multiple crop species to identify plant diseases locally at the embedded controller prior to remote transmission; (S6) publishing disease-identification data using a publish-subscribe communication protocol via a wireless communication module to one or more connected agricultural devices and a remote monitoring platform; and (S7) triggering, via a farm management interface operatively linked to one or more farm operation subsystems, a targeted adjustment of at least one farm operation selected from irrigation, pesticide application, and fertilization based on the disease-identification data.

Embodiments of the present disclosure provide numerous advantages over existing systems:

- Increased Agricultural Productivity: By enabling accurate and timely detection of plant diseases, the system boosts crop yields and reduces losses.
- Cost Efficiency: Streamlined processes and reduced need for manual intervention lower operational costs, making disease management more affordable.
- Rapid Response: Real-time data processing allows for immediate action, preventing the spread of diseases and minimizing potential damage.
- Sustainability: Improved disease management practices contribute to more sustainable farming by reducing the need for chemical treatments and preserving crop health.

Improved Safety: With less chemical intervention, the method ensures safer food production and a healthier environment.

Resource Optimization: Efficient use of resources through precise disease detection and management helps in conserving water and reducing waste.

Informed Decision-Making: Farmers receive actionable insights based on accurate data, enabling better planning and response strategies.

Risk Reduction: Significantly minimizes the risk of damage from plant diseases, protecting crops more effectively.

Crop Protection: Safeguards agricultural crops from emerging threats, enhancing overall farm resilience.

Enhanced Resilience: Boosts farmers' ability to withstand and manage plant diseases.

Real-time Monitoring: Utilizes modern technologies for immediate detection and monitoring of plant health.

Reduced Human Intervention: Automates critical processes, reducing the need for manual labor and minimizing human error.

Environmental Preservation: Helps maintain ecological balance by reducing the environmental footprint of farming practices. By automating the detection of plant diseases, the technology enables more targeted and effective use of pesticides, reducing the overall quantity of harmful chemicals discharged into the environment. Similarly, by facilitating more precise management of irrigation and fertilization, it limits wastage of water and resources, while reducing water and soil pollution.

Scalability and Adaptability: It is designed to be scalable, from smallholder plots to extensive commercial operations. The model can be applied to different kinds of crops simply by reconfiguring it, dependent on the agricultural uses of the end users. That means this could be effectively deployed in any variable environmental conditions and farm practices.

The system may be integrated into existing farm management systems or work in conjunction with other technologies to provide a holistic solution for modern farmers. For example, it may connect to irrigation management systems to automatically adjust watering levels according to specific crop needs detected by the plant disease detection system. Similarly, it may integrate with inventory management systems to optimize pesticide and fertilizer levels according to actual crop needs, reducing costs and minimizing environmental impact. In addition, the system may work in tandem with technologies such as agricultural drones to provide aerial crop surveillance and high-resolution data collection, improving the accuracy of predictions and recommendations.

The technology developed as part of the present disclosure may be extended functionally in the application of the plant disease detection method and system. These extensions may include improvements to the image processing algorithm for more accurate disease detection, the integration of additional sensors for more comprehensive crop monitoring, and the development of disease management functionalities to enable more targeted and effective interventions. In addition, the extensions could explore applications in other agricultural areas, such as soil quality management, crop growth monitoring, and yield forecasting. The extensions to this disclosure would seek to continue innovation in agricultural technology, offering advanced solutions to the ongoing challenges of agricultural production and food security.

Embodiments of the present disclosure may comprise artificial intelligence. The artificial intelligence may support more accurate analysis and identification of plant diseases.

Embodiments of the present disclosure may comprise the use of cloud computing to store and analyze large amounts of agricultural data.

Embodiments of the present disclosure may comprise the use of drones for aerial crop monitoring.

Embodiments of the present disclosure may comprise the implementation of advanced communication protocols, such as the publish-subscribe MQTT broker. This implementation enables efficient communication between the various connected agricultural devices and systems. These improvements would help to enhance the scalability of the technology, enabling its expansion into new areas and applications. The present disclosure paves the way for advancements in crop monitoring and management on a global scale.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents. The disclosures and the description herein are intended to be illustrative and are not in any sense limiting the present disclosure, defined in scope by the following claims.

Many changes, modifications, variations and other uses and applications of the present disclosure will become apparent to those skilled in the art after considering this specification and the accompanying drawings, which disclose the preferred embodiments thereof. All such changes, modifications, variations and other uses and applications, which do not depart from the spirit and scope of the present disclosure, are deemed to be covered by the invention, which is to be limited only by the claims which follow.

The invention claimed is:

1. An intelligent plant disease detection system for agricultural crops, the detection system comprising:

a mechanical support system;

an actuation assembly comprising a motor coupled to the mechanical support system;

a camera assembly mounted to the mechanical support system and configured to obtain spectral and photographic data of the crops, wherein the actuation assembly is configured to move the camera assembly relative to the crops according to a systematic scanning pattern under control of an embedded controller;

one or more processors mounted on the mechanical support system and operatively coupled to the camera assembly, the one or more processors being configured to receive the spectral and photographic data from the camera assembly, perform image processing on the spectral and photographic data, and apply a machine learning component trained on agricultural crop data associated with known plant diseases across multiple crop species to identify plant diseases locally at the embedded controller prior to remote transmission; and a wireless communication module mounted on the mechanical support system and operatively coupled to the one or more processors, the wireless communication module configured to publish the disease-identification data using a publish-subscribe communication protocol to one or more connected agricultural devices or a remote monitoring platform, wherein the detection system is operatively linked with an existing farm management subsystem and is configured to trigger, based on the disease-identification data, a targeted adjustment of at least one farm operation strategy selected from irrigation, pesticide application, or fertilization.

2. The detection system of claim 1, wherein the motor is a rotary motor.

3. The detection system of claim 1, wherein the machine learning component has been trained on agricultural crops afflicted with a known disease using both spectral and photographic data, such that the machine learning component is capable of identifying that same disease in a different plant.

4. The detection system of claim 1, wherein the camera assembly is integrated with one or more additional sensors for more comprehensive crop monitoring.

5. The detection system of claim 1, wherein the detection system is integrated with a drone for capturing photographic and spectral data of crops.

6. A method of detecting plant disease in agricultural crops, the method comprising:

(S1) controlling an actuation assembly comprising a motor to move a camera assembly mounted on a mechanical support system relative to the crops according to a systematic scanning pattern;

(S2) capturing, by the camera assembly, spectral data and photographic data of the crops during the systematic scanning;

(S3) receiving the spectral data and photographic data at one or more processors of an embedded controller;

(S4) performing image processing on the spectral data and photographic data;

(S5) applying a machine learning component trained on agricultural crop data associated with known plant diseases across multiple crop species to identify plant diseases locally at the embedded controller prior to remote transmission;

(S6) publishing disease-identification data using a publish-subscribe communication protocol via a wireless communication module to one or more connected agricultural devices and a remote monitoring platform; and (S7) triggering, via a farm management interface operatively linked to one or more farm operation subsystems, a targeted adjustment of at least one farm operation selected from irrigation, pesticide application, and fertilization based on the disease-identification data.

7. The method of claim 6, wherein the motor is a rotary motor.

8. The method of claim 6, wherein the machine learning component is trained on agricultural crops afflicted with a known disease using both spectral and photographic data, such that the machine learning component is capable of identifying that same disease in a different plant.

9. The method of claim 6, comprising capturing data from one or more additional sensors integrated with the camera assembly for more comprehensive crop monitoring.

10. The method of claim 6, wherein a drone is integrated for capturing photographic and spectral data of crops.

* * * * *